Patented Feb. 22, 1949

2,462,739

UNITED STATES PATENT OFFICE 2,462,739

RECOVERY OF HYDROGEN FLUORIDE-BORON TRIFLUORIDE CATALYSTS

William F. Gresham, Wilmington, Del., assignor to E. I. du Pont de Nemours & Company, Wilmington, Del., a corporation of Delaware No Drawing. Application November 13, 1946, Serial No. 709,423

15 Claims. (Cl. 252—411)

This invention relates to a process for separating hydrogen fluoride-boron trifluoride catalysts from organic matter and more particularly to a process for separating hydrogen fluoride-boron trifluoride catalysts from combinations thereof with aromatic aldehydes.

In the copending application of W. F. Gresham and G. E. Tabet, S. N. 692,936, filed August 24, 1946, it is disclosed that aromatic aldehydes such as benzaldehyde, p-tolualdehyde, alphanaphthaldehyde, p-phenyl-benzaldehyde, 2,5-dimethyl-benzaldehyde, etc., can be prepared by reaction between carbon monoxide and aromatic hydrocarbons in the presence of a hydrogen fluoride-boron trifluoride catalyst at temperatures of about —80° C. to +50° C. under superatmospheric pressure. The reaction product obtained in the process for reacting carbon monoxide with aromatic hydrocarbons in the presence of a hydrogen fluoride-boron trifluoride catalyst evidently is an addition compound or complex or aromatic aldehyde, hydrogen fluoride and boron trifluoride. In certain embodiments this invention relates to a novel process for the separation of the catalyst from the aldehyde in the said reaction product.

An object of this invention is to provide a process for separating both hydrogen fluoride and boron trifluoride from compositions comprising organic matter (such as aromatic aldehydes), hydrogen fluoride and boron trifluoride. Another object of the invention is to provide a process for the separation of hydrogen fluoride-boron trifluoride catalysts from combinations thereof with aromatic aldehydes without excessive loss of the said aromatic aldehyde. A more particular object of the invention is to provide a process for the separation and/or recovery of hydrogen fluoride-boron trifluoride catalyst from the reaction product obtained in the synthesis of p-tolualdehyde from toluene and carbon monoxide in the presence of hydrogen fluoride-boron trifluoride catalyst.

These and other objects are accomplished in accordance with the invention by admixing a metal fluoride of the class consisting of alkali metal and alkaline earth metal fluorides with a composition comprising organic matter and a hydrogen fluoride-boron trifluoride catalyst whereby both the hydrogen fluoride and the boron trifluoride become combined with the said metal fluoride, and thereafter removing the said organic matter from the resulting combination of hydrogen fluoride, boron trifluoride and metal fluoride. In a specific embodiment the invention contemplates a process for separating hydrogen fluoride-boron trifluoride catalysts from combinations thereof with aromatic aldehydes by admixing an alkali metal or alkaline earth metal fluoride with a composition comprising an aromatic aldehyde and a hydrogen fluoride-boron trifluoride catalyst whereby a precipitate containing the said metal fluoride, hydrogen fluoride and boron trifluoride is formed, and thereafter removing the said precipitate from the remainder of the mixture and regenerating hydrogen fluoride and boron trifluoride therefrom by heating the said precipitate to its decomposition temperature.

The invention is broadly applicable. It may be employed for the separation of hydrogen fluoride-boron trifluoride catalysts from organic matter of any kind. Generally, the organic matter is combined with both the hydrogen fluoride and the boron trifluoride in the form of an addition compound, but the invention may also be employed for the separation of hydrogen fluoride and boron trifluoride from mixtures thereof with organic matter which is not combined with the said hydrogen fluoride and boron trifluoride in the form of an addition compound. The invention is highly useful in the separation of hydrogen fluoride-boron trifluoride catalysts from combinations thereof with organic compounds which tend to undergo decomposition or condensation in the presence of the said hydrogen fluoride-boron trifluoride catalysts. The invention is based in part upon the discovery that organic complexes containing hydrogen fluoride and boron trifluoride react rapidly with either alkali metal or alkaline earth metal fluorides even at very low temperatures; it thus becomes possible to separate these catalysts from the organic matter without the excessive decomposition or dehydration which is frequently encountered when organic matter is heated in the presence of the said catalysts. It is well known, for example, that aldehydes are unstable at elevated temperatures in the presence of either hydrogen fluoride or boron trifluoride. The present invention provides a process for the separation of hydrogen fluoride-boron trifluoride catalysts from combinations thereof with aldehydes at temperatures sufficiently low so that the condensation or decomposition of the aldehyde does not occur.

The relative proportions of HF and $BF_3$ in the catalyst to be recovered in accordance with the invention may be varied very widely. In general the preferred catalysts contain about 0.2 to 5.0 mols of $BF_3$ per mol of HF. It is not at all necessary that the ratio of $BF_3$:HF be within this preferred range, since the invention is operable with catalysts containing any ratio of $BF_3$:HF.

The metal fluorides which may be employed in the practice of the invention include sodium fluoride, potassium fluoride, lithium fluoride, rubidium fluoride, calcium fluoride, strontium fluoride, barium fluoride, or mixtures thereof such as sodium fluoride-lithium fluoride, sodium fluoride-calcium fluoride, and the like. The alkali metal fluorides are generally somewhat more effective in producing complete removal of the hydrogen fluoride and boron trifluoride from the organic matter. On the other hand the alkaline earth metal fluorides, especially calcium fluoride, are advantageous in that after the removal of hydrogen fluoride and boron trifluoride from the organic matter the resulting complex of alkaline earth metal fluoride-boron trifluoride and hydrogen fluoride is capable of releasing boron trifluoride with considerable ease at elevated temperatures. Outstanding results are obtained in the practice of the invention when a mixture of metal fluorides is employed, e. g. an alkaline earth metal fluoride admixed with an alkali metal fluoride. Thus, when a mixture of sodium fluoride and calcium fluoride is employed, the sodium fluoride causes more thorough removal of HF and $BF_3$, and the calcium fluoride permits release of HF and $BF_3$ at comparatively low temperature; moreover, when these mixed fluorides are used the caking tendency during heating to release HF and $BF_3$ is decreased very markedly which is an important technical and economic advantage.

A very remarkable result is encountered in the practice of the invention when the metal fluoride employed for recovery of HF and $BF_3$ is lithium fluoride. It has been discovered in accordance with this invention that lithium fluoride not only gives excellent clean-up of both hydrogen fluoride and boron trifluoride, but also that the resulting combination of lithium fluoride, hydrogen fluoride and boron trifluoride releases both hydrogen fluoride and boron trifluoride almost quantitatively at a comparatively low temperature, namely about 275° to 375° C. This behavior of lithium fluoride is anomalous, not only because of the low temperature at which the HF and $BF_3$ are recoverable from lithium fluoride (as compared with the temperatures required when other alkali metal fluorides are used), but also because of the fact that both the HF and the $BF_3$ are released from combination with lithium fluoride simultaneously at the said low temperature.

The temperature at which the metal fluoride is admixed with the combination of hydrogen fluoride-boron trifluoride catalyst and organic matter in accordance with the invention, depends upon the relative stability of the organic matter in the presence of hydrogen fluoride and boron trifluoride. Generally it is desirable not to employ temperatures in excess of about 100° C. The temperature which is usually employed for the separation of hydrogen fluoride-boron trifluoride catalyst from an aromatic aldehyde is generally about —80° to +80° C., preferably about —50° to +20° C. In general the resulting combination of alkali metal or alkaline earth metal fluoride with hydrogen fluoride and boron trifluoride is insoluble in the organic matter; the inorganic precipitate can therefore be removed from the said organic matter by any conventional method, such as filtration, centrifuging or the like. If desired, an organic solvent, preferably a hydrocarbon, may be employed as diluent to assist in the separation of the inorganic precipitate. In unusual cases the inorganic complex containing hydrogen fluoride and boron trifluoride may be somewhat soluble in the organic matter. When this occurs it is preferable to add to the organic matter a hydrocarbon solvent in which the inorganic complex is insoluble thus causing precipitation of the inorganic complex.

If desired, the hydrogen fluoride and boron trifluoride may be recovered from the complex containing the alkali metal or alkaline earth metal fluoride, hydrogen fluoride, and boron trifluoride by heating the said combination in a suitable corrosion-resistant vessel. The temperature at which the inorganic complex is decomposed, yielding hydrogen fluoride and boron trifluoride, is generally within the range of about 200° to 800° C. The complexes containing alkali metal fluorides require a relatively high temperature for optium results, preferably about 500° to 800° C., with the exception of the complex containing lithium fluoride, hydrogen fluoride and boron trifluoride, which gives up its hydrogen fluoride and boron trifluoride at a convenient rate at a temperature of about 250° to 400° C. The pressure during the pyrolysis of the metal fluoride-HF-$BF_3$ complex may be atmospheric, subatmospheric or superatmospheric. Fluidized bed techniques may be employed in this pyrolysis step if desired. Sintering and caking of the fluorides may be suppressed or avoided by the use of inert supports or thermally stable inert powdered fillers.

The invention is illustrated further by means of the following examples.

*Example 1.*—A mixture containing 1.0 mol toluene, 0.5 mol $BF_3$ and 0.5 mol HF was heated with carbon monoxide in a copper-lined shaker tube at a temperature of —33° to —18° C. for 10 minutes under a pressure of 100 to 710 atmospheres. The resulting product was discharged into a vessel containing one mol of calcium fluoride, after which toluene was added until a fluid slurry was formed. The organic matter was then separated from the resulting precipitate by filtration. Distillation of the filtrate gave p-tolualdehyde which was free of hydrogen fluoride and boron trifluoride.

*Example 2.*—A mixture containing 0.5 mol of p-tolualdehyde, about 200 cc. toluene, 0.37 mol $BF_3$ and 0.5 mol HF was treated with one mol of sodium fluoride at a temperature of —40° C. The resulting mixture was allowed to warm to room temperature. It was then filtered and the precipitate was washed several times with toluene. The filtrate was mixed with 0.1 mol of fresh sodium fluoride and the mixture was again filtered and washed as before. The final filtrate was distilled, giving 55 grams (0.46 mol) of recovered p-tolualdehyde.

*Example 3.*—A mixture of 0.5 mol p-tolualdehyde, 225 cc. toluene, 0.35 mol $BF_3$ and 0.5 mol HF was mixed with one mol lithium fluoride at a temperature of about —40° C. The resulting product was filtered and the precipitate was washed with toluene. The toluene solution was washed with water; titration of the water showed that 86–90% of the HF and $BF_3$ were removed by the LiF. Distillation of the combined filtrates after the water wash gave 95% recovery of p-tolualdehyde.

*Example 4.*—A complex having the composition $(LiF)_2(HF)(BF_3)$, prepared by treating a mixture containing $HF \cdot BF_3$, with the stoichiometric quantity of lithium fluoride was heated in a copper vessel at a temperature of about 336° to 374° C. for 1.75 hours. Both the hydrogen fluoride and the boron trifluoride were evolved from the complex simultaneously, and the recovery of both hydrogen fluoride and boron trifluoride was virtually quantitative.

*Example 5.*—A complex having the composition $(LiF)_2(HF)(BF_3)$ was prepared by heating 2 mols of lithium fluoride, one mol of boron trifluoride and one mol of hydrogen fluoride in a copper-lined pressure resistant reaction vessel at a temperature of 35° to 53° C. for 15 minutes. The resulting product was a dry powder. This powder was transferred to a copper pyrolysis vessel wherein it was heated at a pyrolysis temperature of 302° to 317° C. for 115 minutes. The weight loss of the powder during pyrolysis was 75.2 grams which corresponds to a conversion of 85.5%. The gases which were evolved during the pyrolysis were collected in a water scrubber. Analysis of the resulting aqueous solution (volume 395 cc.) showed that it contained 14% by weight of $BF_3$ and 5% by weight of HF. This corresponds to a recovery of about 81.5% of the $BF_3$ and about 98.7% of the hydrogen fluoride.

*Example 6.*—A calcium fluoride-boron trifluoride-hydrogen fluoride complex obtained by a method similar to that described in Example 5 was heated 15 hours at a temperature of about 300° C. Most of the boron trifluoride and only a relatively small quantity of the hydrogen fluoride which had been combined in the complex were released.

*Example 7.*—A sodium fluoride-hydrogen fluoride-boron trifluoride complex obtained by a method similar to that described in Example 5 was heated at a temperature of about 458° to 514° C. for 1.5 hours. About 20% of the hydrogen fluoride and boron trifluoride which had been combined in a complex was evolved.

*Example 8.*—A mixture of metal fluorides containing about one mol of sodium fluoride per 3 mols of calcium fluoride was added to a toluene solution of p-totualdehyde-HF-$BF_3$ complex prepared as disclosed in Example 1. The resulting precipitate was removed by filtration and it was found that the HF·$BF_3$ clean-up was 100%. The precipitate was washed several times with toluene and after drying was heated at a temperature of 387° to 395° C. for 2.5 hours. About 45% of the hydrogen fluoride and boron trifluoride in the complex was thereby released.

It is to be understood that any suitable method may be employed for separating the organic matter from the complex of metal fluoride, hydrogen fluoride and boron trifluoride which is produced in the practice of the invention. For example, when the metal fluoride which is employed is an alkali metal fluoride other than lithium fluoride, it may be advantageous to remove the organic product by distillation, filtration, centrifuging or otherwise, and thereafter to recover hydrogen fluoride and boron trifluoride from the inorganic complex by treatment with an inorganic acid such as sulfuric acid. As will be understood from the examples, the latter treatment is not preferred if the alkali metal fluoride which is employed is lithium fluoride, since both the hydrogen fluoride and the boron trifluoride are very readily recovered from the resulting lithium fluoride complex by simple pyrolysis.

It is to be understood also that the residue of impure lithium fluoride which is obtained by pyrolysis of the lithium fluoride complex may be recovered and reused in place of pure lithium fluoride in the practice of the invention. As a matter of fact, this residue has certain advantages over pure lithium fluoride since, after being recycled several times, it tends to reach a constant composition which results in decreased losses of both hydrogen fluoride and boron trifluoride during subsequent reuse.

Since many different embodiments of the invention may be made without departing from the spirit and scope thereof, it is to be understood that I do not limit myself except as set forth in the following claims.

I claim:

1. A process for removing hydrogen fluoride-boron trifluoride catalysts from combinations thereof with aromatic aldehydes which comprises admixing a metal fluoride of the class consisting of alkali metal and alkaline earth metal fluorides with a composition comprising an aromatic aldehyde and a hydrogen fluoride-boron trifluoride catalyst combined therewith whereby both the hydrogen fluoride and the boron trifluoride become combined with the said metal fluoride and a precipitate containing combined hydrogen fluoride and boron trifluoride and metal fluoride is obtained and thereafter separating the said aromatic aldehyde from the resulting combination of hydrogen fluoride, boron trifluoride and metal fluoride and recovering hydrogen fluoride and boron trifluoride therefrom by pyrolysis at a temperature in the range of 200° to 800° C.

2. A process for removing hydrogen fluoride-boron trifluoride catalysts from combinations thereof with p-tolualdehyde which comprises admixing a metal fluoride of the class consisting of alkali metal and alkaline earth metal fluorides with a composition comprising p-tolualdehyde and a hydrogen fluoride-boron trifluoride catalyst combined therewith whereby both the hydrogen fluoride and the boron trifluoride become combined with the said metal fluoride and a precipitate containing combined hydrogen fluoride and boron trifluoride and metal fluoride is obtained and thereafter separating the said p-tolualdehyde from the resulting combination of hydrogen fluoride, boron trifluoride and metal fluoride and recovering hydrogen fluoride and boron trifluoride therefrom by pyrolysis at a temperature in the range of 200° to 800° C.

3. A process for separating hydrogen fluoride-boron trifluoride from combinations thereof with aromatic aldehydes which comprises admixing an alkali metal fluoride and an alkaline earth metal fluoride with a composition comprising an aromatic aldehyde, hydrogen fluoride and boron trifluoride at a temperature of about −80° to +80° C. whereby both the hydrogen fluoride and the boron trifluoride become combined with the said metal fluorides, and thereafter separating the combination of hydrogen fluoride, boron trifluoride and metal fluorides from the resulting mixture, and recovering hydrogen fluoride and boron trifluoride therefrom by pyrolysis at a temperature in the range of about 200° to 800° C.

4. A process for removing hydrogen fluoride-boron trifluoride from combinations thereof with aromatic aldehydes which comprises admixing a metal fluoride of the class consisting of alkali metal and alkaline earth metal fluorides with a composition comprising an aromatic aldehyde, hydrogen fluoride and boron trifluoride at a temperature of about −80° to +80° C. in the presence of a hydrocarbon diluent whereby a precipitate containing both the hydrogen fluoride and the boron trifluoride combined with the metal fluoride is produced and thereafter separating the combination of hydrogen fluoride, boron trifluoride and metal fluoride from the resulting mixture, and recovering hydrogen fluoride and boron trifluoride therefrom by pyrolysis at a temperature in the range of 200° to 800° C.

5. A process for removing hydrogen fluoride-boron trifluoride catalyst from combinations thereof with p-tolualdehyde which comprises admixing a metal fluoride of the class consisting of alkali metal and alkaline earth metal fluorides with a composition comprising p-tolualdehyde, hydrogen fluoride and boron trifluoride at a temperature of about −80° to +80° C. in the presence of a hydrocarbon diluent whereby a precipitate containing both the hydrogen fluoride and the boron trifluoride combined with the metal fluoride is produced and thereafter separating the combination of hydrogen fluoride, boron trifluoride and metal fluoride from the resulting mixture, and recovering hydrogen fluoride and boron trifluoride therefrom by pyrolysis at a temperature in the range of 200° to 800° C.

6. The process of claim 4 in which the said metal fluoride is calcium fluoride.

7. The process of claim 4 in which the said metal fluoride is sodium fluoride.

8. The process of claim 4 in which the said metal fluoride is lithium fluoride.

9. A process for removing hydrogen fluoride-boron trifluoride catalyst from combinations thereof with p-tolualdehyde which comprises admixing a metal fluoride of the class consisting of alkali metal and alkaline earth metal fluorides with a composition comprising p-tolualdehyde, hydrogen fluoride and boron trifluoride at a temperature of about −80° to +80° C. in the presence of a hydrocarbon diluent whereby a precipitate containing both the hydrogen fluoride and the boron trifluoride combined with the metal fluoride is produced, separating the complex of hydrogen fluoride, boron trifluoride and metal fluoride from the resulting mixture and recovering hydrogen fluoride and boron trifluoride from the said complex by pyrolysis.

10. A process for removing hydrogen fluoride-boron trifluoride from combinations thereof with aromatic aldehydes which comprises admixing a metal fluoride of the class consisting of alkali metal and alkaline earth metal fluorides with a composition comprising an aromatic aldehyde, hydrogen fluoride and boron trifluoride at a temperature of about −80° to +80° C. in the presence of hydrocarbon diluent whereby a precipate containing both the hydrogen fluoride and the boron trifluoride combined with the metal fluoride is produced, separating the complex of hydrogen fluoride, boron trifluoride and metal fluoride from the resulting mixture, and recovering hydrogen fluoride and boron trifluoride from the said complex by pyrolysis.

11. A process for removing hydrogen fluoride-boron trifluoride from combinations thereof with aromatic aldehydes which comprises admixing lithium fluoride with a composition comprising an aromatic aldehyde, hydrogen fluoride and boron trifluoride at a temperature of about −80° to +80° C. in the presence of a hydrocarbon diluent whereby a precipitate containing both hydrogen fluoride and boron trifluoride combined with the said lithium fluoride is produced, separating the said complex from the resulting mixture and recovering hydrogen fluoride and boron trifluoride from the said complex by pyrolysis.

12. A process for separating hydrogen fluoride-boron trifluoride from combinations thereof with aromatic aldehydes which comprises admixing lithium fluoride with a composition comprising an aromatic aldehyde, hydrogen fluoride and boron trifluoride at a temperature of about −80° to +80° C. in the presence of a hydrocarbon diluent whereby a precipitate containing both hydrogen fluoride and boron trifluoride combined with the said lithium fluoride is produced, separating the said complex from the resulting mixture and recovering hydrogen fluoride and boron trifluoride from the said complex by pyrolysis at a temperature within the range of about 200° to 800° C.

13. A process for separating hydrogen fluoride-boron trifluoride from combinations thereof with aromatic aldehydes which comprises admixing lithium fluoride with a composition comprising an aromatic aldehyde, hydrogen fluoride and boron trifluoride at a temperature of about −80° to +80° C. in the presence of a hydrocarbon diluent whereby a precipitate containing both hydrogen fluoride and boron trifluoride combined with the said lithium fluoride is produced, separating the said complex from the resulting mixture and recovering hydrogen fluoride and boron trifluoride from the said complex by pyrolysis at a temperature within the range of about 250° to 400° C.

14. A process for separating hydrogen fluoride-boron trifluoride catalyst from combinations thereof with p-tolualdehyde which comprises admixing lithium fluoride with a composition comprising p-tolualdehyde, hydrogen fluoride and boron trifluoride at a temperature of about −80° to +80° C. in the presence of a hydrocarbon diluent whereby a precipitate containing both hydrogen fluoride and boron trifluoride combined with the said lithium fluoride is produced, separating the said complex from the resulting mixture and recovering hydrogen fluoride and boron trifluoride from the said complex by pyrolysis at a temperature within the range of about 250° to 400° C.

15. A process for separating hydrogen fluoride-boron trifluoride from combinations thereof with aromatic aldehydes which comprises mixing lithium fluoride with a composition comprising an aromatic aldehyde, hydrogen fluoride and boron trifluoride at a temperature of about −80° to +80° C. in the presence of a hydrocarbon diluent whereby a precipitate containing both hydrogen fluoride and boron trifluoride combined with the said lithium fluoride is obtained, separating the said complex from the resulting mixture and recovering hydrogen fluoride and boron trifluoride from the said complex by pyrolysis at a temperature within the range of about 250° to 400° C., whereby a residue comprising impure lithium flouride is obtained, and reusing the said impure residue in place of lithium flouride in a subsequent series of similar operations for recovery of hydrogen fluoride and boron trifluoride from an additional quantity of the said composition comprising aromatic aldehyde, hydrogen fluoride and boron trifluoride.

WILLIAM F. GRESHAM.

REFERENCES CITED

The following references are of record in the file of this patent:

UNITED STATES PATENTS

| Number | Name | Date |
|---|---|---|
| 2,085,535 | Langedijk | June 29, 1937 |
| 2,284,554 | Beyerstedt | May 26, 1942 |
| 2,366,736 | Linn | Jan. 9, 1945 |
| 2,383,643 | Fulton | Aug. 28, 1945 |
| 2,400,874 | Burk | May 28, 1946 |
| 2,414,999 | Bearse | Jan. 28, 1947 |